:b

United States Patent
Micke et al.

(10) Patent No.: US 8,794,449 B2
(45) Date of Patent: Aug. 5, 2014

(54) DEVICE AND METHOD FOR OPERATING A FUEL FILTER

(75) Inventors: Michael Micke, Stuttgart (DE); Holger Schwarz, Stuttgart (DE)

(73) Assignee: Mann+Hummel GmbH, Ludwigsburg (DE)

( * ) Notice: Subject to any disclaimer, the term of this patent is extended or adjusted under 35 U.S.C. 154(b) by 1065 days.

(21) Appl. No.: 12/746,012

(22) PCT Filed: Oct. 6, 2008

(86) PCT No.: PCT/EP2008/063336
§ 371 (c)(1),
(2), (4) Date: Sep. 15, 2010

(87) PCT Pub. No.: WO2009/071357
PCT Pub. Date: Jun. 11, 2009

(65) Prior Publication Data
US 2011/0011807 A1   Jan. 20, 2011

(30) Foreign Application Priority Data
Dec. 6, 2007   (DE) .......................... 10 2007 059 051

(51) Int. Cl.
*B01D 17/02* (2006.01)
(52) U.S. Cl.
USPC .......................... 210/416.4; 210/744; 210/741
(58) Field of Classification Search
USPC ........... 210/744, 741, 799, 800, 416.4, 323.1, 210/295
See application file for complete search history.

(56) References Cited

U.S. PATENT DOCUMENTS

| | | | |
|---|---|---|---|
| 5,078,901 A | | 1/1992 | Sparrow |
| 6,207,045 B1 * | | 3/2001 | Jiang ............................... 210/86 |
| 6,474,289 B1 * | | 11/2002 | Lilly et al. ................. 123/198 D |
| 6,830,679 B2 * | | 12/2004 | Tsuihiji et al. .................. 210/87 |
| 2006/0070956 A1 * | | 4/2006 | Herrmann et al. ............ 210/744 |
| 2006/0118478 A1 * | | 6/2006 | Linhart et al. ................. 210/348 |
| 2007/0113894 A1 * | | 5/2007 | Apostolides .................. 137/266 |

FOREIGN PATENT DOCUMENTS

| | | |
|---|---|---|
| EP | 1319824 | 6/2003 |
| EP | 1642632 | 4/2006 |
| EP | 1726818 | 11/2006 |

OTHER PUBLICATIONS

PCT search report of PCT/EP2008/063336.

* cited by examiner

*Primary Examiner* — Nam Nguyen
*Assistant Examiner* — Claire Norris
(74) *Attorney, Agent, or Firm* — James Hasselbeck

(57) ABSTRACT

A device and a method for operating a fuel filter (1) with a diaphragm (16) for cleaning water separated from the fuel, comprising a collecting chamber (9) for the water geodetically arranged at the bottom in a housing (2) of the fuel filter (1), are proposed, comprising at least one sensor (10, 11) each for the maximum (10) and for the minimum (11) water level in the collecting chamber (9), by means of which a valve (13) for discharging the water from the collecting chamber (9) arranged between the collecting chamber (9) and a water purification device (14) containing the diaphragm (16) is controllable. A detection device (21) for detecting the flow behavior of the water between the collecting chamber (9) and the water purification device (14) is present with which at least the time interval ($\Delta$ t) of the change of the water level between a signal of the sensor (10) for the maximum and of the sensor (11) for the minimum water level is detectable and in that a computing and memory unit (27) for the evaluation of the signals in the detection device (21) and for signaling (28) a deviation from a predetermined flow behavior of the diaphragm (16) is present.

8 Claims, 3 Drawing Sheets he invention concerns a device and a method for operating a fuel filter, in particular for diesel fuel, comprising a diaphragm for cleaning water separated from the fuel, according to the preamble of the device claim and the method claim.

DEVICE AND METHOD FOR OPERATING A FUEL FILTER

CROSS REFERENCE TO RELATED APPLICATIONS

This application is US National Stage Entry of international patent application no. PCT/EP2008/063336, filed Oct. 6, 2008 designating the United States of America, the entire disclosure of which is incorporated herein by reference. Priority is claimed based on Federal Republic of Germany patent application no. 10 2007 059 051.4, filed Dec. 6, 2007.

TECHNICAL FIELD

The invention concerns a device and a method for operating a fuel filter, in particular for diesel fuel, comprising a diaphragm for cleaning water separated from the fuel, according to the preamble of the device claim and the method claim.

PRIOR ART

It is disclosed, for example, in DE 10 2005 024 481 A1 that in such a device water is separated by a fuel filter. In case of fuels for motor vehicles, in various regions of the world greatly varying quantities of water in the fuel, in particular diesel fuel, must be taken into account that is harmful for the internal combustion engines. Since the separated water is heavier than fuel, the water sinks to the lower area of the fuel filter and collects in a collecting chamber. The separated water is then supplied by means of a valve to a diaphragm, preferably of inorganic material, in a water purification device. For this purpose water level sensors are arranged in the collecting chamber which sensors are connected to the valve and control the valve.

The diaphragm is designed such that only purified water can pass through it. The diaphragm is impermeable for the fuel molecules. The diaphragm according to the prior art has, for example, channel structures that are closed off at one side. The closure is effected by a water-resistant and fuel-resistant material so that the closure permanently closes off the channel structures.

The separated water that has passed across the diaphragm should be relatively clean at the exit so that it can be simply discharged into the environment. The quality of the separated and discharged water should be ensured for a longer operating time of the diaphragm, since, for example, cracks or defects may occur in the diaphragm or the diaphragm may be clogged and a satisfactory flow performance may no longer be ensured, which would make the exchange of the diaphragm necessary.

SUMMARY OF THE INVENTION

The invention is based on a device for operating a fuel filter with a diaphragm for cleaning the water separated from the fuel whose operability is to be monitored in a simple way.

It is known in this connection that for such device the water separated from the fuel collects in a collecting chamber that is geodetically positioned at the bottom in the housing of the fuel filter and in that at least one sensor each for the maximum and one for the minimum water level in the collecting chamber is present by means of which a valve between the collecting chamber and a water purification device containing the diaphragm is controllable for discharging the water from the collecting chamber. According to the invention, in an advantageous way a detection device for detecting the flow rate of the diaphragm is present with which at least the time interval of the change of the water level between a signal of the sensor for the maximum and of the sensor for the minimum water level is detectable, and in that an evaluation unit for evaluating the signals of the detection device and for signaling a malfunction of the diaphragm that has been detected or is to be expected based on a preset flow behavior.

By means of the evaluation according to the invention of the flow rate of the diaphragm, during drive operation of the motor vehicle or during a service stop the actual state or the flow rate of the diaphragm can be detected in a simple way. In this way a simple estimation is possible whether the diaphragm, its sealant or its seal tightness is defective, whether or when the diaphragm as a result of unsatisfactory flow rate must be changed, or whether and how often the diaphragm had to discharge especially high water quantities as a result of, for example, diesel fuel with an especially high water contents. In any case, with the detection device according to the invention an alert in regard to a possibly required exchange of the diaphragm can be signaled.

Since, as has been mentioned above, greatly different water quantities in the fuel must be taken into account in different regions of the world and the quality of the separated water also may vary greatly, the detection of the diaphragm state according to the present invention is particularly suitable to enable a flexible servicing interval for the fuel filter. Moreover, this detection increases significantly the safety of the entire water separating system in the fuel filter with a water purification device, because, for example, cracks or defects in the diaphragm of the water purification device can be safely detected and then suitable measures, for example, an exchange, can be initiated.

In order to obtain a meaningful detection of the operating state of the fuel filter, according to the invention advantageously the flow behavior of the water is measured and the results are preferably electronically saved. This can be realized by means of an electronic evaluation device with a memory that is integrated in the filter system or within a central control unit of the motor vehicle.

Aside from the time that has elapsed during water discharge between the signals of two water level sensors, also other parameters may be taken into consideration. According to the invention, it is proposed that in a connecting passage between the collecting chamber and the water purification device as a further component of the detection device a volume flow sensor for the water flowing therein is provided and/or that in the housing of the water purification device as a further component of the detection device a pressure sensor for the water contained therein is provided.

According to a first embodiment of a method according to the invention, with the detection device the time interval of the change of the water level between the maximum and the minimum water levels upon discharge of water from the collecting chamber is measured and saved, and upon dropping below and/or surpassing a predetermined length of time this is employed for detecting a malfunction or a required exchange of the diaphragm. Alternatively, a continuous measuring of the change of the water level over time is possible with appropriate sensors.

In the simplest embodiment, a sensor detects the minimal level and a further sensor detects the maximum level of the water in the collecting chamber, as disclosed in itself in the aforementioned prior art DE 10 2005 024 481 A1, and the time interval between these two signals is measured and saved. It is possible in this connection to save all discharge cycles of the water, the highest measured discharge time interval or only some thereof, or always the last discharge event, and employ it for the detection of the operating state of the diaphragm.

The limit values of the time interval can be preset as a function of the kind and the size of the diaphragm, the collected quantity of water, and the proportion of dissolved and dispersed hydrocarbons in the water.

In case of a long signaling of a maximum water level, this can also be utilized, for example, as a further signal for an exchange of the diaphragm because in this case, possibly as a result of bad fuel quality, especially high water quantities have been separated by the fuel filter. In this case, depending on the quantity and the frequency of high water quantities, the diaphragm performance will decrease and the diaphragm must be exchange earlier than scheduled in an extreme situation.

According to a further embodiment of the method according to the invention, in an advantageous way by means of the detection device also the volume of the water flowing in the connecting channel between the collecting chamber and the water purification device can be detected and, upon dropping below and/or surpassing a predetermined volume flow range, this can be used for detecting a malfunction or signaling a necessary exchange of the diaphragm.

Moreover, the detection device according to the invention can also detect the pressure of the water contained in the water purification device and, upon dropping below and/or upon surpassing a predetermined pressure range, this can be used for detecting a malfunction of the diaphragm.

When a drop of the operating pressure in the housing of the water purification device occurs after closing the valve, this correlates directly with the flow rate of the diaphragm and is thus also suitable to detect the operating state of the diaphragm. In a simple way, for this purpose only the pressure directly after closing the valve and then after a predetermined time, for example, after three minutes, can be measured. An additional information is available however when a continuous pressure drop curve is recorded. This means that after closing the valve the pressure is continuously measured and saved for a predetermined amount of time, for example, ten minutes, so that in this way further information can be queried from the system.

In summary, it can thus be noted that with the invention a significant increase of operational safety of a diaphragm in the fuel filter of a motor vehicle by recognizing diaphragm defects and clogged diaphragm pores can be achieved. In addition, it is possible to recognize the operating state of the diaphragm directly within the vehicle by feedback to the driver or upon servicing of the motor vehicle. In this way, depending on the employed diaphragm, for example, permeation performance, diaphragm surface area, geometry, and driving conditions, water quantity and temperature, a flexible response is possible and service can be performed as needed.

Also, it is possible with the invention in an advantageous way that a detection of blocking by a microbiological biofilm can be done. The discharge system according to the invention, possibly indirectly, can provide information in regard to microbiology of the entire fuel system; for example, when bacteria are present on the diaphragm, most likely they will also be present in other parts of the fuel system.

BRIEF DESCRIPTION OF THE DRAWINGS

The invention will be explained with the aid of the Figures of the drawing with one embodiment. It is shown in.

EMBODIMENT(S) OF THE INVENTION

Figure 1:
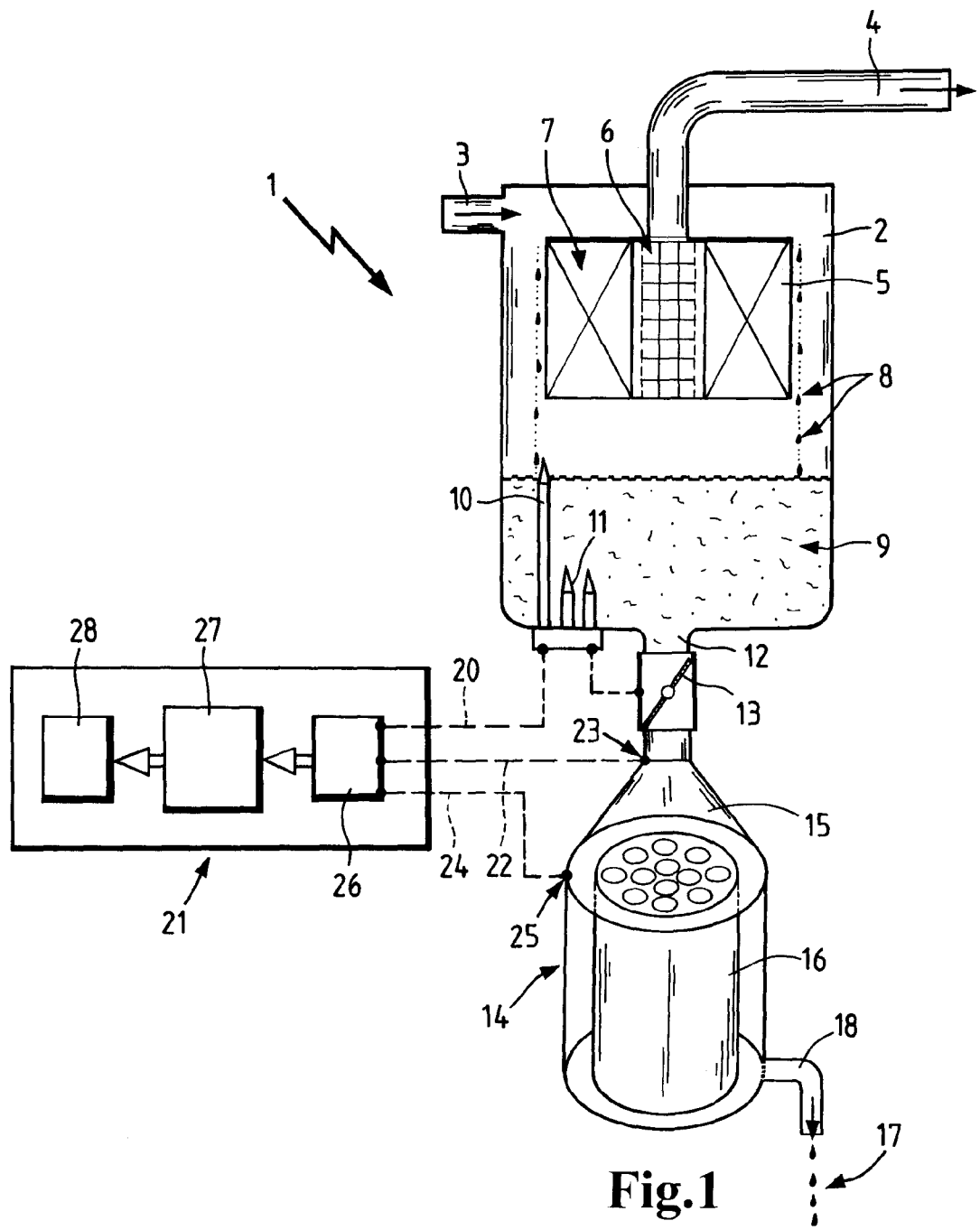
FIG. 1 a section of a fuel filter with a water separating system that is provided with a diaphragm for water purification.

In FIG. 1 a fuel filter 1 for the fuel supply of an internal combustion engine, not explained in detail in this context, is shown in section. The fuel filter 1 comprises a housing 2 with an inlet 3 and an outlet 4 wherein in the housing 2 a filter element 5 for filtration of the fuel, in particular for filtering solid foreign particles, is arranged. The filter element 5 surrounds a clean side 6 to the outlet 4 that is seal-tightly separated from a raw side 7 with inflow through the inlet 3.

On the filter element 5, schematically indicated water droplets 8 are separated and drop into a collecting chamber 9. The collecting chamber 9 is arranged geodetically at the bottom in the housing 2. In the area of the collecting chamber 9 in the housing 2 sensors 10 for detecting a maximum and sensors 11 for detecting a minimum water level in the collecting chamber 9 are arranged.

The housing 2 comprises below the collecting chamber 9 an outlet 12 through which the water discharge of the collecting chamber 9, controlled by a valve 13, can be performed. Through the valve 13 the discharged water reaches a water purification device 14 in which in a housing 15 a diaphragm 16 is glued in seal-tightly. The diaphragm 16, for example, of ceramic, is designed such that only purified water can pass through because the diaphragm 16 is substantially impermeable for fuel molecules. The purified water 17 can then be discharged through an outlet 18.

In FIG. 1 it is illustrated in a simplified way that the control of the valve 13 can be realized by the signals of the sensors 10 and 11. With the signal line 20 shown in dashed line it is indicated how the valve 13 and a detection device 21 are supplied with this signal wherein in the detection device 21 primarily the time interval of the discharge time of the water that is controlled by the valve 13 is detected and evaluated. By means of a signal line 22 it is indicated how, by means of a corresponding sensor 23 in the flow of the water, also the volume flow of the water and, by means of a signal lines 24 with a corresponding sensor 25, also the pressure of the water are detected and evaluated. For this purpose, in the detection device 21 a component 26 for coupling the signal lines 20, 23, and 24 and a computing and memory component 27 for evaluating the signals and a signaling action 28 are schematically shown.

Figure 2:
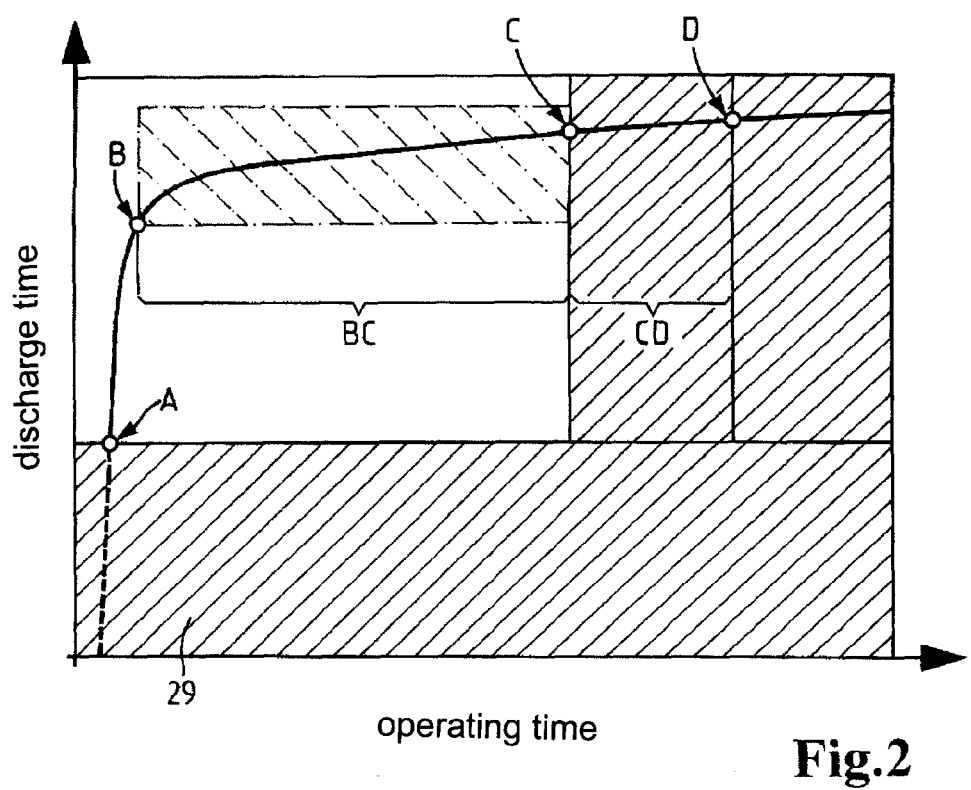
FIG. 2 an illustration of the function of the discharge times of the water from a collecting chamber of the fuel filter across the operating time of the diaphragm.

In FIG. 2 a curve is shown that illustrates the typical course of the discharge times, in accordance with the respective time intervals Δt, of the water from the collecting chamber 9 according to FIG. 1 across the operating time of the diaphragm 16. In case of new diaphragms 16, a very high flow rate and therefore a very short discharge time (point A) is to be expected but it is reduced quickly as a result of a cover layer formation on the diaphragm 16, as can be taken from the greatly increasing discharge time (point B) across the operating time, and then drops significantly slower (point C and D). After the cover layer has thus formed on the surface of the diaphragm 16, the diaphragm 16 can be operated for a very long period of time between the point B and the point C so that this can be defined as operating range BC that however can vary depending on the diaphragm type, diaphragm size, collected water quantity and proportion of dissolved and dispersed hydrocarbons in the water.

When dropping below the operating range BC, i.e., the discharge time is smaller than preset as minimum (below point A), a defect of the diaphragm 16 exists. In this case, indicated by the crosshatched area 29, an alarm signal is triggered that indicates to the driver of the motor vehicle that he must drive to the next service station and exchange the diaphragm 16. Primarily in case of a complete saved record of the discharge times for several discharge cycles, smaller defects can be detected also based on untypical changes in the flow at the diaphragm 16. In addition, the valve 13 is closed by a signal of the sensor 11 (minimum sensor) so that no fuel can be discharged into the environment.

When surpassing the operating range BC, i.e., the discharge time is greater than the maximum preset by point C, the flow through the diaphragm 16 has dropped too much and a diaphragm exchange is recommended. In this case, signaling can be realized in two or several different variants. The range that is identified in FIG. 2 as a safety range CD can be defined such, for example, that a safe discharge of water based on the rated water quantity is still possible and only upon servicing the vehicle a signal is supplied to the service technician and then an exchange of the diaphragm 16 can be performed.

However, as soon as the point D has been reached or is surpassed, the water quantity can no longer be safely discharge or the volume flow of the water purification device 14 is higher than the normal discharge performance of the diaphragm 16 so that this situation can also be assigned to the alarm range 29. Then the driver will receive an appropriate error message that, for example, can be signaled in the form of a visual or acoustic signal in the driver's cabin and requires an immediate or as-soon-as-possible exchange of the diaphragm 16.

When the sensor 10 for the maximum water level in the collecting chamber 9 according to FIG. 1 supplies continuously for an extended period of time a signal for collected water, it is to be assumed that, as a result of a bad fuel quality, especially high water quantities have been separated by the filter 5. In this case, depending on the quantity and frequency of high water quantities, the capacity of the diaphragm 16 is reduced and diaphragm 16 must be exchanged earlier than scheduled in extreme situations.

As an example for the physical values of such an operating range BC, a safety range CD, and an alarm range >D, the following values can be used: surface area of the diaphragm 16=100 cm$^2$, operating pressure=6 bar, water volume in the collecting chamber 9=200 ml, initial discharge time (point A) =4 min (<4 min corresponds to alarm), discharge time until point C is reached=16 min, and discharge time until point D is reached=80 min.

Figure 3:
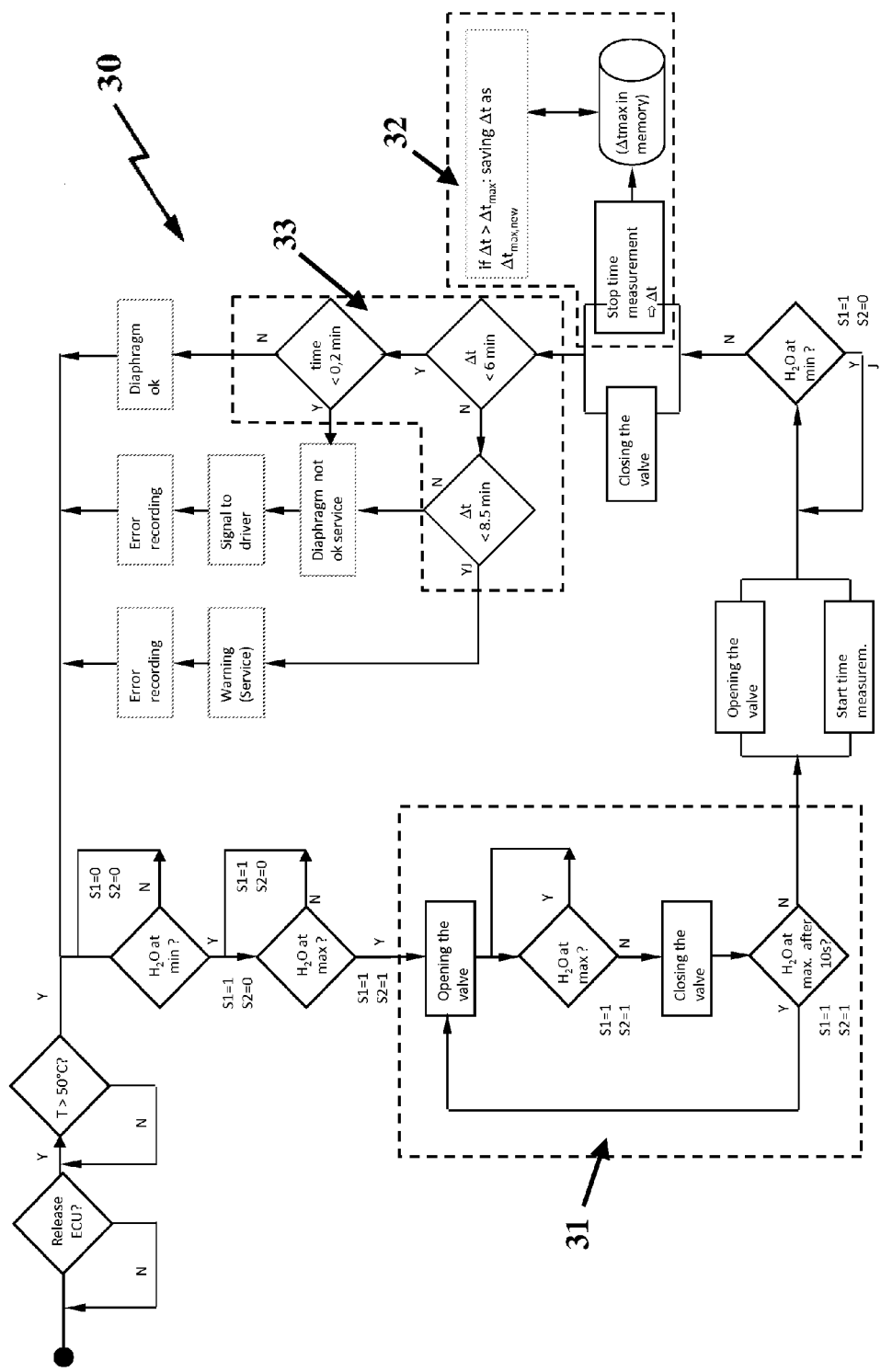
FIG. 3 a block diagram of an electronic circuit for a sequence of the inventive method for signaling a detected malfunction of the diaphragm as a result of preset flow behavior of the diaphragm.

In FIG. 3, an example of the sequence of the method according to the invention for realization by means of an appropriate electronic circuit 30 is shown in a simplified way, wherein for the individual steps without special reference numerals reference is being had to the functional indications in the respective blocks correlated with the steps. After triggering the start signal for detecting the flow behavior of the water at the diaphragm 16 and release of the detection unit 21 (ECU) as well as a temperature check, it must first be ensured that also a defined water volume between the sensor 10 (maximum) and the sensor 11 (minimum) according to FIG. 1 is present. The sensor signals are referred to for sensor 10 with S1 and for the sensor 11 with S2 with 0 or 1, respectively.

After passing through a delay loop 31 that will be explained infra, the measurement of the time interval $\Delta t$ after opening the valve 13 up to reaching the level at the sensor 11 (minimum) and the subsequent closing of the valve 13 and stopping of time measurement will follow. In this connection, the existing longest time interval $\Delta t_{max}$ of the discharge time, respectively, is detected in a logic module 32 and saved.

As a result of continuing water flow from the water separation at the filter 5 there is however the risk that a higher water volume has been filtered up to reaching the sensor 11 (minimum) and therefore a reduced capacity, i.e., a greater time interval $\Delta t$ as a discharge time, is calculated than actually exists. Therefore, the electronic circuit 30 according to FIG. 3 contains the additional logic module as a delay loop 31 by means of which a measurement is evaluated as correct and is saved only when, within a predetermined amount of time (here 10 s), no change in the water level happens at the sensor 10, i.e., when no water continues to flow from the separation at the filter 5.

As a result of partially greatly fluctuating and also again increasing discharge times, for example, after frost cycles or after diaphragm regeneration, the last measured discharge time must not be used but the longest measured time interval $\Delta t_{max}$ of the discharge time must be utilized as service indicator. For this purpose, a comparison of the actually measured time interval $\Delta t$ with the time interval $\Delta t_{max}$ of the discharge time saved in the memory is required within the logic module 32.

In a further logic module 33 the time intervals $\Delta t$ of the discharge times of the water based on the threshold values for signaling the state of the diaphragm 16 to the driver of the motor vehicle are evaluated and then the signals referenced in the blocks are supplied to the driver.

Moreover, when performing the method according to the invention, care must be taken that splashing of water due to uneven road surfaces will not result in undesirable triggering of the sensor 10 (maximum) (splashing water=briefly greatly increased water concentration in the fuel). Therefore, a minimum time should be preset (for example, 10 s) for which time period a signal must be present at the sensor 10 before the valve 13 will open. A precalculation of the tolerable splash water quantity of the diaphragm 16 can be performed based on the last measured time interval $\Delta t$. Based on it, it is possible to calculate the still tolerable splash water quantity or the still possible volume flow of the water separation at the filter 5 for the next discharge of water. In this way, it is possible to decide upon service whether, depending on the region, an exchange of the diaphragm 16 is expedient or not.

The calculation can be realized by depositing a functional equation, for example, in the detection unit with the electronic circuit 30. The longest measured time interval $\Delta t_{max}$ of the discharge time is then employed as a variable in this equation. For example, for $\Delta t_{max}$=10 min, the maximum tolerable splash water quantity =$\Delta t_{max}/8.45)^{*}$ (0.996)=0.84%. In the exemplary calculation the fuel may thus contain a maximum of 0.84% of splash water in order to safely ensure discharge without water being present at the filter 5.

The afore described logic functions based on the circuit 30 in FIG. 3 are in principle also transferable onto the aforementioned further detection parameters such as volume flow and pressure of the water. For example, as described before, by means of pressure drop curves, flow measurements and continuous water level measurement, for example, points can be defined that enable the detection of the state of the diaphragm 16 in the same way so that in a simple way, depending on the region, it can be determined whether an exchange of the diaphragm 16 should be carried out.

The invention claimed is:

1. A method of operating a fuel filter, comprising:
   providing said fuel filter including:
   a fuel filter housing;
   a water collection chamber arranged geodetically at a bottom of said housing;
   a minimum water level sensor arranged on said housing and extending into said water collection chamber to a minimum water level position to detect a minimum water level in said collection chamber and produce a minimum water level signal;
   a maximum water level sensor arranged on said housing and extending into said water collection chamber to a maximum water level position to detect a maximum water level in said collection chamber and produce a maximum water level signal;
   providing a water purification device arranged below said fuel filter housing, including:
   a water purification device housing having an inlet and an outlet;
   a diaphragm arranged within said water purification device housing and operable to pass water from said inlet to said outlet while impermeable to flow of fuel;
   providing discharge valve arranged between said collection chamber and said water purification device and operable to discharge water from said collection chamber into said inlet of said water purification device;
   providing a detection device configured to detect flow behavior of water flowing between said collection chamber and said water purification device, said detection device in communication with said water level sensors to receive said minimum water level signal from said minimum water level sensor and said maximum water level signal from said maximum water level sensor, said detection device including:
   a computing and memory unit configured to evaluate water level signals from said water level sensors and operate said discharge valve;
   wherein said detection device is controllably connected to said discharge valve to operate said valve to discharge water from said collection chamber;
   wherein said computing and memory unit is configured to determine a drain time interval ($\Delta t$);
   wherein said computing and memory unit is operable for signaling a deviation from a predetermine flow behavior of water flowing though said water purification device diaphragm during said discharge of water from said collection chamber; and
   wherein said predetermined flow behavior includes said determined drain time interval;
   the method comprising the steps of:
   providing a predetermined length of time interval of a minimum discharge time (A) below which a defect in the diaphragm is indicated;
   providing a predetermined length of time interval of a maximum discharge time (C) above which diaphragm replacement is indicated;
   separating water from fuel and accumulating water in said collection chamber until water level reaches said maximum water level;
   detecting said maximum water level in said collection chamber by said maximum water level sensor;
   opening said water discharge valve to discharge water from said collection chamber to said water purification device;
   draining water from said collection chamber to said water purification device through said discharge valve until high water level is not detected by said maximum water level sensor;
   closing said water discharge valve;
   waiting a predetermined delay time, if maximum water level is detected, then
   continuing at the step of opening said water discharge valve; waiting a predetermined delay time, if maximum water level is not detected, then
   reopening said water discharge valve and determining a drain time interval start time measurement;
   continuing with the water discharge valve until minimum water level is detected by said minimum water level sensor;
   determining a drain time interval stop time measurement;
   closing said water discharge valve;
   calculating a measured drain time interval ($\Delta t$) as elapsed time from the drain time interval start time to the drain time interval stop time;
   measuring said drain time interval ($\Delta t$) as the water drain time between said drain time interval start time to the drain time interval stop time;
   saving said measured drain time interval ($\Delta t$);
   if said measured drain time interval ($\Delta t$)<said minimum discharge time (A) or said measured drain time interval ($\Delta t$)>said maximum discharge time (C) then signaling a malfunction of said diaphragm.

2. The method according to claim 1, wherein after said opening step the method further comprises:
   signaling malfunction of said diaphragm if said detected maximum water level at said maximum water level sensor persists for longer than a predetermine length of time (D).

3. The method according to claim 1, wherein said predetermined length of time intervals are predetermined as a function of the kind and size of said diaphragm, a collected water quantity, and a proportion of dissolved and dispersed hydrocarbons in the water.

4. The method according to claim 1,
   wherein said detecting step further comprises
   detecting volume of the water flowing in the connecting channel between the collecting chamber and the water purification device as a signal to said detection device; and
   wherein said method further comprises
   signaling a malfunction of the diaphragm if said detected volume of water flowing is outside of a predetermined volume flow range.

5. The method according to claim 1,
   wherein said detecting step further comprises
   detecting pressure of water in said water purification device housing as a signal to said detection device; and
   wherein said method further comprises
   signaling a malfunction of the diaphragm if said detected pressure is outside of a predetermined pressure range.

6. The method according to claim 5, further comprising:
   measuring said water pressure directly after closing said discharge valve;
   continuing to measure said water pressure for a predetermined period of time after said closing of said discharge valve.

7. The method according to claim 5, further comprising:

determining a discharge time operating range (B,C) as a first range;

determining a discharge time safety range (C,D) as a second range;

determining a discharge time alarm range (>D) as a third range;

signaling state of said diaphragm according to comparison of said measured drain time interval ($\Delta t$) to said first, second and third ranges;

wherein signaling of the state of the diaphragm is realized with different signaling means in the safety range (C,D) and in the alarm range (>D);

wherein the ranges (B,C), (C,D) and (>D) are determined based upon measured discharge times as a function of diaphragm operating time for a water level transition from the detected maximum water level to the detected minimum water level.

8. The method according to claim 7, wherein after said opening step the method further comprises signaling malfunction of said diaphragm if said detected maximum water level at said maximum water level sensor persists for longer than a predetermine length of time (D);

wherein said predetermined length of time intervals are predetermined as a function of the kind and size of said diaphragm, a collected water quantity, and a proportion of dissolved and dispersed hydrocarbons in the water;

wherein said detecting step further includes detecting volume of the water flowing in the connecting channel between the collecting chamber and the water purification device as a signal to said detection device; and wherein said method further includes signaling a malfunction of the diaphragm if said detected volume of water flowing is outside of a predetermined volume flow range.

* * * * *